US011928568B1

(12) United States Patent
Vaughan et al.

(10) Patent No.: US 11,928,568 B1
(45) Date of Patent: Mar. 12, 2024

(54) TRAINING AND USING MACHINE LEARNING MODELS TO PLACE EFFECTIVE MIXED-MODALITY MESSAGES

(71) Applicant: INTUIT INC., Mountain View, CA (US)

(72) Inventors: Frank Andrew Vaughan, Mountain View, CA (US); Surya Teja Adluri, Sunnyvale, CA (US)

(73) Assignee: Intuit, Inc., Mountain View, CA (US)

( * ) Notice: Subject to any disclaimer, the term of this patent is extended or adjusted under 35 U.S.C. 154(b) by 0 days.

(21) Appl. No.: 18/345,139

(22) Filed: Jun. 30, 2023

(51) Int. Cl.
*G06F 17/00* (2019.01)
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

| | | | | |
|---|---|---|---|---|
| 9,875,445 | B2* | 1/2018 | Amer | G06N 7/01 |
| 10,108,674 | B1* | 10/2018 | Kolcz | H04L 67/53 |
| 2021/0084670 | A1* | 3/2021 | Chauhan | H04L 65/80 |
| 2022/0230639 | A1* | 7/2022 | Hewitt | G10L 15/26 |

OTHER PUBLICATIONS

Moitreya Chatterjee et al., Combining Two Perspectives on Classifying Multimodal Data for Recognizing Speaker Traits. In Proceedings of the 2015 ACM on International Conference on Multimodal Interaction. Association for Computing Machinery, 7-14. <https://doi.org/10.1145/2818346>. November (Year: 2015).*

Tareq Abed Mohammed et al., Effect machine learning techniques for analyzing and filtering spam Mails problems. In The 7th International Conference on Engineering & amp; MIS 2021. Association for Computing Machinery, Article 1, 1-7. <https://doi.org/10.1145/3492547.3492562>, October (Year: 2021).*

* cited by examiner

*Primary Examiner* — Greta L Robinson
(74) *Attorney, Agent, or Firm* — Patterson + Sheridan, LLP

(57) ABSTRACT

Certain aspects of the present disclosure provide techniques for managing the transmission of mixed-modality messages using machine learning models. An example method generally includes generating, using a first machine learning model, an embedding representation of a mixed-modality message. The mixed-modality message is classified as an effective message or an ineffective message using a second machine learning model and the embedding representation of the mixed-modality message. One or more actions are taken to manage transmission of the mixed-modality message based on the classifying the mixed-modality message as an effective message or an ineffective message.

22 Claims, 5 Drawing Sheets

TRAINING AND USING MACHINE LEARNING MODELS TO PLACE EFFECTIVE MIXED-MODALITY MESSAGES

INTRODUCTION

Aspects of the present disclosure relate to machine learning models, and more specifically training and using machine learning models to place effective messages in communications generated by users of a software application.

BACKGROUND

Software applications are generally deployed for use by many users for the performance of a specific function. These applications may be deployed as web applications accessible over the Internet or a private network or as desktop applications including static components executed from a local device and dynamic components executed from content retrieved from a network location. These applications can include financial applications, such as tax preparation applications, accounting applications, personal or business financial management applications, or the like; social media applications; other electronic communications applications; and so on.

Some applications may include components that allow targeted messages to be presented to users of these applications, for example in communications performed outside of a user session within the application or while the user is interacting with the application (e.g., in an interstitial page between different components of a web application, in a dedicated messaging panel in an application, in electronic communications sent to the user after a user begins interacting with the application, etc.). These messages may be multimodal messages including content in a text modality that involves a minimal amount of overhead and content in a multimedia (e.g., audio and/or visual) modality which may impose more overhead for transmitting the message to a client device.

Because multi-modal messages include data from various modalities, generating and transmitting multi-modal messages may involve a significant resource overhead in terms of network bandwidth, storage, power, and other resources that may be involved in generating such messages, transmitting such messages to a (potentially large) set of recipients, and processing such messages and the content therein on devices used by recipients of the message. Such resources, however, may be wasted if a message is not effective (e.g., does not result in a recipient of a message performing a desired action, such as accessing content on a remote system).

BRIEF SUMMARY

Certain embodiments provide a computer-implemented method for managing the transmission of mixed-modality messages using machine learning models. An example method generally includes generating, using a first machine learning model, an embedding representation of a mixed-modality message. The mixed-modality message is classified as an effective message or an ineffective message using a second machine learning model and the embedding representation of the mixed-modality message. One or more actions are taken to manage transmission of the mixed-modality message based on the classifying the mixed-modality message as an effective message or an ineffective message.

Certain embodiments provide a computer-implemented method for training a machine learning model for managing the transmission of mixed-modality messages. An example method generally includes training a first machine learning model to generate embeddings for mixed-modality messages based on correlations between data in different modalities in messages in a training data set of mixed-modality messages. A second machine learning model is trained to predict effectiveness of mixed-modality messages based on the generated embeddings for the training data set of mixed-modality messages. The first machine learning model and the second machine learning model are deployed.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
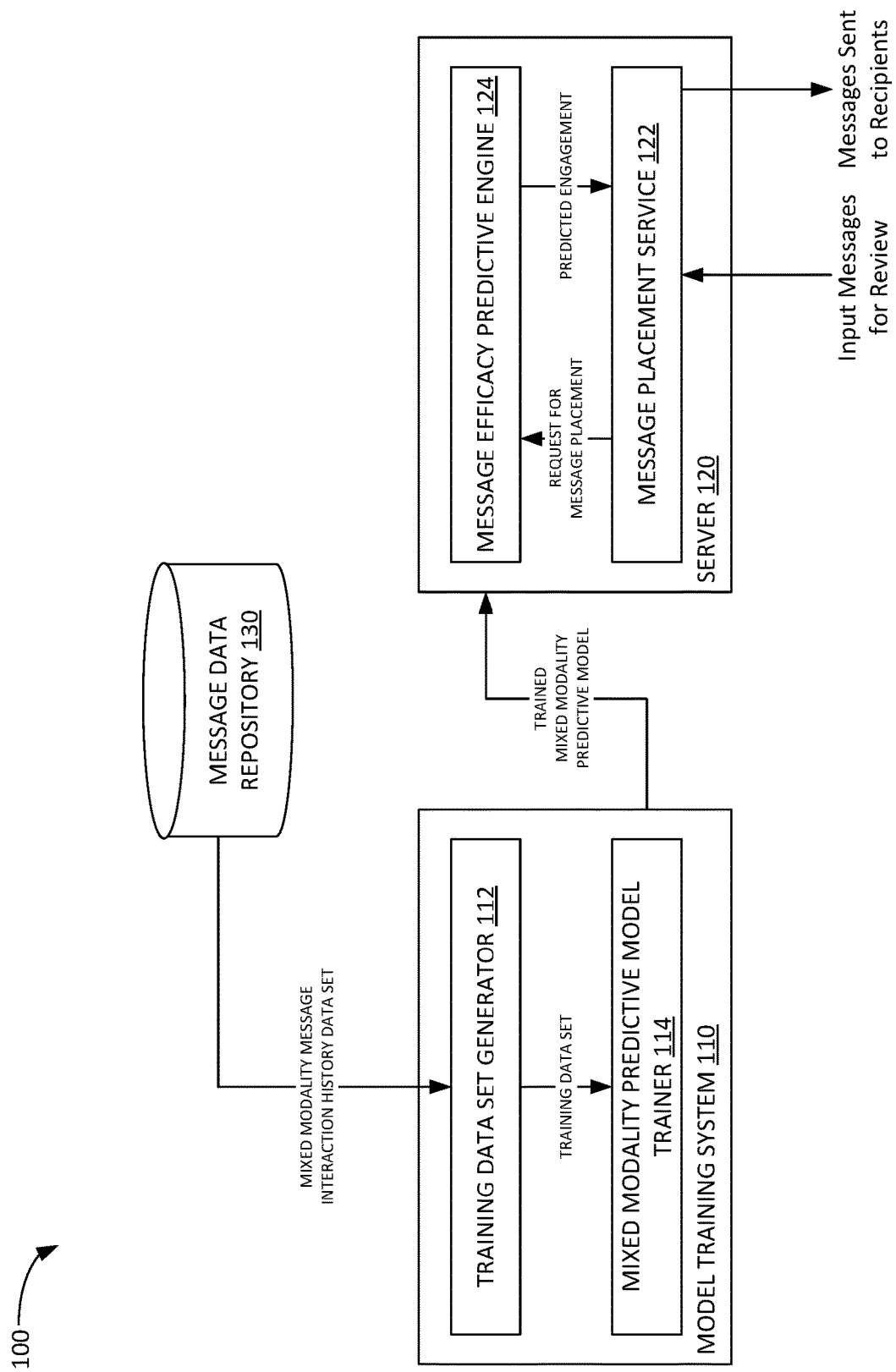
FIG. 1 depicts an example computing environment in which mixed-modality messages are delivered to recipients based on machine learning models trained to predict an effectiveness of the mixed-modality messages, according to embodiments of the present disclosure.

In various applications, messages may be presented to various recipients in order to deliver information to such recipients, induce the recipients to perform some action, or the like. These messages may be mixed-modality messages including both textual and non-textual (e.g., multimedia, such as video or audio) components. Generally, as discussed, the textual components of a message may impose a small amount of computational overhead in transmission and processing (e.g., for rendering on the screen of a recipient's computing device); however, non-textual components in a message may impose a significant computational overhead which may scale as the number of recipients of a mixed-modality message increases. Because these messages may be intrusive and impose resource costs (e.g., bandwidth, processing, power usage, etc. for delivering messages to users of the software application), efficient use of computational resources may result from generating and transmitting "effective" messages to recipients of such messages (e.g., messages with high interaction rates by the recipients of the messages), while inefficient use of computational resources may result from generating and transmitting "ineffective" messages to recipients of such messages.

For text-dominant messages, the effectiveness of a message can be modeled based on contextual data, such as the topic of the message, the textual content of the message, and interaction rates with the message. However, for mixed-modality messages, the effectiveness of the message may depend on both the content in a text modality and the content in a non-text modality. For example, an effective message may exhibit a close correlation between the text and non-textual content in the message, while an ineffective message may exhibit a mismatch between the text and non-textual content in the message. Further, the dominance of different modalities in a message may have a significant effect on predictions of the meaning of a message and whether the message is an effective message or an ineffective message.

Embodiments of the present disclosure provide techniques for managing the transmission of mixed-modality messages to recipients based on machine learning models that predict whether a mixed-modality message is likely to be an effective or an ineffective message. As discussed in further detail herein, the machine learning models can predict the effectiveness of a mixed-modality message by mapping content in different modalities to different embeddings, and then generating a combined embedding for the mixed-modality message by combining the embeddings for each of the content modalities in the message. A classifier model can subsequently use the combined embedding to predict the effectiveness of a message, and the predicted effectiveness of the mixed-modality message can be used to manage transmission of a message to a set of recipients for the mixed-modality message. Generally, in managing the transmission of a mixed-modality message based on the predictive effectiveness of the mixed-modality message, embodiments of the present disclosure may allow the transmission of messages predicted to be effective and may block, or at least delay, the transmission of messages predicted to be ineffective. In some embodiments, information about the embeddings generated for the different modalities of content in the mixed-modality message may be output to a user to inform the user of the reasons why the message is likely to be ineffective so that the message can be revised (manually or automatically) prior to transmission. Thus, embodiments of the present disclosure improve the user experience of a software application by generating and allowing the transmission of mixed-modality messages that are likely to be effective. Further, by generating and allowing the transmission of mixed-modality messages that are likely to be effective, embodiments of the present disclosure may reduce the amount of computational resources wasted by transmitting ineffective messages to recipients so that such resources can be used for other purposes.

Example Training of Machine Learning Models and Managing Transmission of Mixed-Modality Messages Using the Machine Learning Models FIG. 1 illustrates an example computing environment 100 in which mixed-modality messages are delivered to recipients based on machine learning models trained to predict an effectiveness of such messages. As illustrated, computing environment 100 includes a model training system 110, and server 120, and targeted message data repository 130.

Model training system 110 generates training data sets from information associated with mixed-modality messages previously transmitted by various parties through message placement service 122 and trains machine learning models to analyze the content of targeted messages and predict whether a mixed-modality message is likely to be an effective message or an ineffective message (e.g., based on historical messages generated by similar users, such as users in a same industry). Model training system 110 may be any of a variety of computing devices that can generate training data sets and train predictive models based on these training data sets, such as a server computer, a cluster of computers, cloud computing instances, or the like. As illustrated, model training system 110 includes a training data set generator 112 and a mixed modality predictive model trainer 114.

Training data set generator 112 may be configured to retrieve historical mixed-modality messages (e.g., from message data repository 130) about mixed-modality messages previously transmitted to recipients through message placement service 122 and generate a training data set that can be used to train machine learning models to generate scores predictive of a likelihood that the message will be an effective message or an ineffective message (e.g., in relation to historical effectiveness for messages generated by similar users). The training data set may include historical mixed-modality messages transmitted through message placement service 122, mapped to corresponding interaction rates associated with each of the historical mixed-modality messages.

In some aspects, training data set generator 112 may generate a training data set including information about the users that transmitted each of the mixed-modality messages in the training data set through message placement service 122. In doing so, training data set generator 112 can allow for a machine learning model to be trained to predict the effectiveness of a message placed through message placement service 122 by considering both the content of the message (in each of the modalities of data included in the message) and information about the user, as the metrics defining an effective or ineffective message may vary based on a classification associated with the user. For example, the information about the users that transmitted each of the mixed-modality messages may include information such as an industry classification (e.g., as indicated in various standardized codes, such as a code from the North American Industry Classification System (NAICS)), a size classification (e.g., based on a number of employees associated with the user, revenue metrics associated with the user, etc.), and other information that may be predictive of message effectiveness for a particular type of user (and the parties with which that particular type of user interacts).

In some aspects, training data set generator 112 may generate a plurality of user classification-specific training data sets for training multiple, user classification-specific models. A user classification may be associated with specific types of users for which a user classification-specific model is to be trained. For example, a user classification may be based on various data points about the user, as the metrics defining an effective or ineffective message may vary based on a classification associated with the user. For example, the information about the users that transmitted each of the mixed-modality messages may include information such as an industry classification (e.g., as indicated in various standardized codes, such as a code from the North American Industry Classification System (NAICS)), a size classification (e.g., based on a number of employees associated with the user, revenue metrics associated with the user, etc.), and other information that may be predictive of message effectiveness for a particular type of user (and the parties with which that particular type of user interacts).

In some aspects, training data set generator 112 may generate a training data set based on a subset of mixed-modality messages for a given user classification for which performance information exists in message data repository 130. For example, training data set generator 112 can generate a training data set based on messages deemed to be highly effective (e.g., having interaction metrics exceeding a first threshold value) and messages deemed to be highly ineffective (e.g., having interaction metrics below a second threshold value). Effectiveness metrics may be, in some aspects, binarized such that the messages deemed to be highly effective have an effectiveness value of "1" and the messages deemed to be highly ineffective have an effectiveness value of "0." By generating a training data set based on messages deemed to be highly effective and messages that are deemed to be highly ineffective, aspects of the present disclosure may allow for a machine learning model to be trained based on clear exemplars of effective and ineffective messages, which may thus allow for the resulting model to push the predicted effectiveness of a mixed-modality message to either extreme and avoid, or at least minimize, the likelihood that a mixed-modality message will be assigned an effectiveness score that is predictive of neither message effectiveness nor message ineffectiveness.

Mixed modality predictive model trainer 114 generally trains and deploys one or more machine learning models that message efficacy predictive engine 124 can use to predict the effectiveness of a message for use by message placement service 122 in controlling the transmission of mixed-modality messages through the message placement service 122.

In some aspects, mixed modality predictive model trainer 114 can train a first machine learning model that maps an input mixed-modality message into an embedding representation of the mixed-modality message and a second machine learning model that classifies the mixed-modality message as an effective message or ineffective message based on the embedding representation of the mixed-modality message. The first machine learning model may be, for example, a generative model such as a contrastive language-image pretraining (CLIP) model or other model that can generate embedding representations for data in different modalities, and then combine the modality-specific embedding representations into a combined embedding representation of the mixed-modality message. A CLIP model, for example, can be used to generate a first embedding for textual content and a second embedding for non-textual (e.g., image) content included in an input mixed-modality message. Training the CLIP model may allow for correlations to be drawn between the textual and non-textual content so that the CLIP model can generate an embedding representation for an input mixed-modality message that includes information about a level of correlation between the meaning of the textual content and the non-textual content. It should be recognized that the first machine learning model may include any type of model which can learn correlations between different modalities of data and map data in different modalities into different embeddings in a latent space.

The second machine learning model may be a binary classification model that predicts whether a mixed-modality message is likely to be an effective message (e.g., have high rates of interaction or rates of recipients completing a desired task) or an ineffective message (e.g., have low rates of interaction or rates of recipients completing a desired task). The second machine learning model may be trained based on supervised learning techniques, in which the training data set ultimately used to train the second machine learning model may map embedding representations of mixed-modality messages generated by the first machine learning model to a metric indicative of whether the mixed-modality messages were effective messages or ineffective messages. In some aspects, the embedding representations of mixed-modality messages may be mapped to a binary indication of effectiveness, where a message is deemed effective if an interaction metric for the message exceeds some defined threshold and is deemed ineffective if the interaction metric for the message does not exceed the defined threshold. The defined threshold may be set globally (e.g., based on a percentage of recipients who interact with a message, where a global threshold is used to distinguish between effective and ineffective messages) or on a per-user-classification basis (e.g., based on an assumption that an effective message will have different interaction characteristics based on data points such as an industry associated with the user, a size associated with the user, and the like).

In some aspects, the second machine learning model may be a gradient boosting decision tree, such as a CatBoost machine learning model. A gradient boosting decision tree may be configured to handle data that is categorical in nature and may build a model based on a combination of predictions from weak models. The resulting model may allow for various relationships in the training data set(s) to be captured so that accurate predictions may be made, even on noisy or incomplete data.

In some aspects, the second machine learning model may be trained to predict an amount of interaction with an input mixed-modality message. In such a case, the training data set may include mappings of mixed-modality messages (or embedding representations thereof) with interaction metrics (e.g., interaction rates, such as a percentage of recipients who interacted with a message) associated with each of the mixed-modality messages in the training data set. In doing so, the second machine learning model may be trained to both predict an effectiveness of a message (where a prediction of whether a message is likely to be effective or ineffective may be based on a threshold value delineating effective and ineffective messages) and predict the proportion of recipients who are likely to interact with the message. In some aspects, the second machine learning model may further allow for mixed-modality messages to be ranked in order of predicted effectiveness, which may allow a user of server 120 to input a plurality of mixed-modality messages and choose to transmit, to a set of recipients, the message from the plurality of mixed-modality messages having a highest predicted interaction rate, choose to transmit no message and generate a new mixed-modality message by modifying the message having the highest predicted interaction rate, or the like.

After training the first and second machine learning models, the models may be deployed to a server 120 for use in managing the transmission of mixed-modality messages through message placement service 122 executing on the server 120. For example, as illustrated, the models may be deployed to a message efficacy predictive engine 124 executing on or otherwise associated with server 120.

Server 120 generally hosts an application that may be accessed by users of the application and may provide a set of functions to users of the application. As illustrated, server 120 includes message placement service 122 and message efficacy predictive engine 124.

Generally, message placement service 122 receives a mixed-modality message which a user proposes to transmit to a set of recipients through message placement service 122. Message placement service 122 requests a prediction of the effectiveness of the message from message efficacy predictive engine 124 and receives information identifying, for example, a classification of whether the message is likely to be effective or ineffective, a predicted level of engagement with the message, or the like. Message placement service 122 can then use the information received from message efficacy predictive engine 124 to manage the transmission of the mixed-modality message to a set of recipients.

In managing the transmission of the mixed-modality message to the set of recipients, message placement service 122 may be configured to allow a message to be transmitted to the set of recipients if the mixed-modality message is predicted to be effective. For example, where the models deployed to message efficacy predictive engine 124 are configured to output a binary classification (e.g., indicating that the message is either likely to be effective or likely to be ineffective), message placement service 122 may be configured to allow transmission of messages that are predicted to be effective and may block the transmission of messages that are predicted to be ineffective. Where the models deployed to message efficacy predictive engine 124 are configured to output a predicted level of engagement with the mixed-modality message, a threshold value may be defined at message placement service 122 for determining whether to allow or block transmission of a mixed-modality message.

In some aspects, if message placement service 122 receives a prediction from message efficacy predictive engine 124 indicating that an input mixed-modality message is likely to be ineffective, message placement service 122 can generate a notification indicating that the input mixed-modality message is likely to be ineffective and provide the notification to the user associated with the input mixed-modality message. In some aspects, the notification may include information explaining why the message is likely to be ineffective. For example, where embedding representations of data in different modalities are significantly different (e.g., are not semantically similar), message placement service 122 can indicate to the user associated with the mixed-modality message that the mixed-modality message is likely to be ineffective because there exists a semantic mismatch between the content in different modalities in the mixed-modality message. In some aspects, message placement service 122 may provide examples of effective messages generated by similar users to the user associated with the input mixed-modality message as examples of effective messages.

In some aspects, message placement service 122 may allow a user to override a block on transmitting an input mixed-modality message to recipients and thus cause message placement service 122 to distribute a mixed-modality message despite a prediction that the mixed-modality message is likely to be ineffective. In some aspects, message placement service 122 may flexibly allow for such overrides to occur. For example, a threshold effectiveness score (or level of interaction) may be defined. Messages having predicted effectiveness scores above the threshold—indicating that a message may not be effective, but may not have a strong chance of being ineffective—may be transmitted by message placement service 122 upon receipt of a request to override a block on the message. Messages, however, having predicted effectiveness scores below the threshold may remain blocked until the user associated with the input message revises the message to a point where the predicted effectiveness of the message meets a minimum predicted effectiveness.

Message efficacy predictive engine 124 uses the machine learning models trained by mixed modality predictive model trainer 114 and deployed to message efficacy predictive engine 124 to predict the effectiveness of an input message. As discussed, message efficacy predictive engine 124 may execute multiple machine learning models which may be used in conjunction with each other in order to predict the effectiveness of a message. Generally, a first machine learning model may map a mixed-modality message into an embedding space based on embeddings associated with data in each of the data modalities included in the mixed-modality message (e.g., based on a combination of modality-specific embeddings). Meanwhile, a second machine learning model may classify the mixed-modality message as either effective or ineffective based on the embedding representation generated for the mixed-modality message by the first machine learning model.

In some embodiments, user feedback with respect to a prediction may be used to retrain one or more machine learning models. For example, if a user provides feedback that confirms or rejects a prediction regarding the effectiveness of a given message, the user feedback may be used to label a new training data instance that includes features of the message, and the new training data instance may be used by mixed modality predictive model trainer 114 to retrain the machine learning model that classifies mixed-modality messages as either effective or ineffective. User feedback that confirms a prediction may include, for example, a user proceeding with transmission of a message predicted to be highly effective, a user accepting a recommendation not to transmit a message predicted to be highly ineffective, and/or the like. User feedback that rejects a prediction may include, for example, a user proceeding with transmission of a message predicted to be highly ineffective (e.g., overriding a block on transmitting such a message), a user determining not to transmit a message predicted to be highly effective, and/or the like. Furthermore, the effectiveness or ineffectiveness of messages transmitted after a prediction as described herein may continue to be monitored (e.g., based on interactions with the messages by recipients), and the determined effectiveness or ineffectiveness of such messages may be used to generate new training data for retraining the model. Continual retraining of a machine learning model using new training data over time provides a feedback loop by which the machine learning model is continuously improved for use in subsequent predictions.

Figure 2:
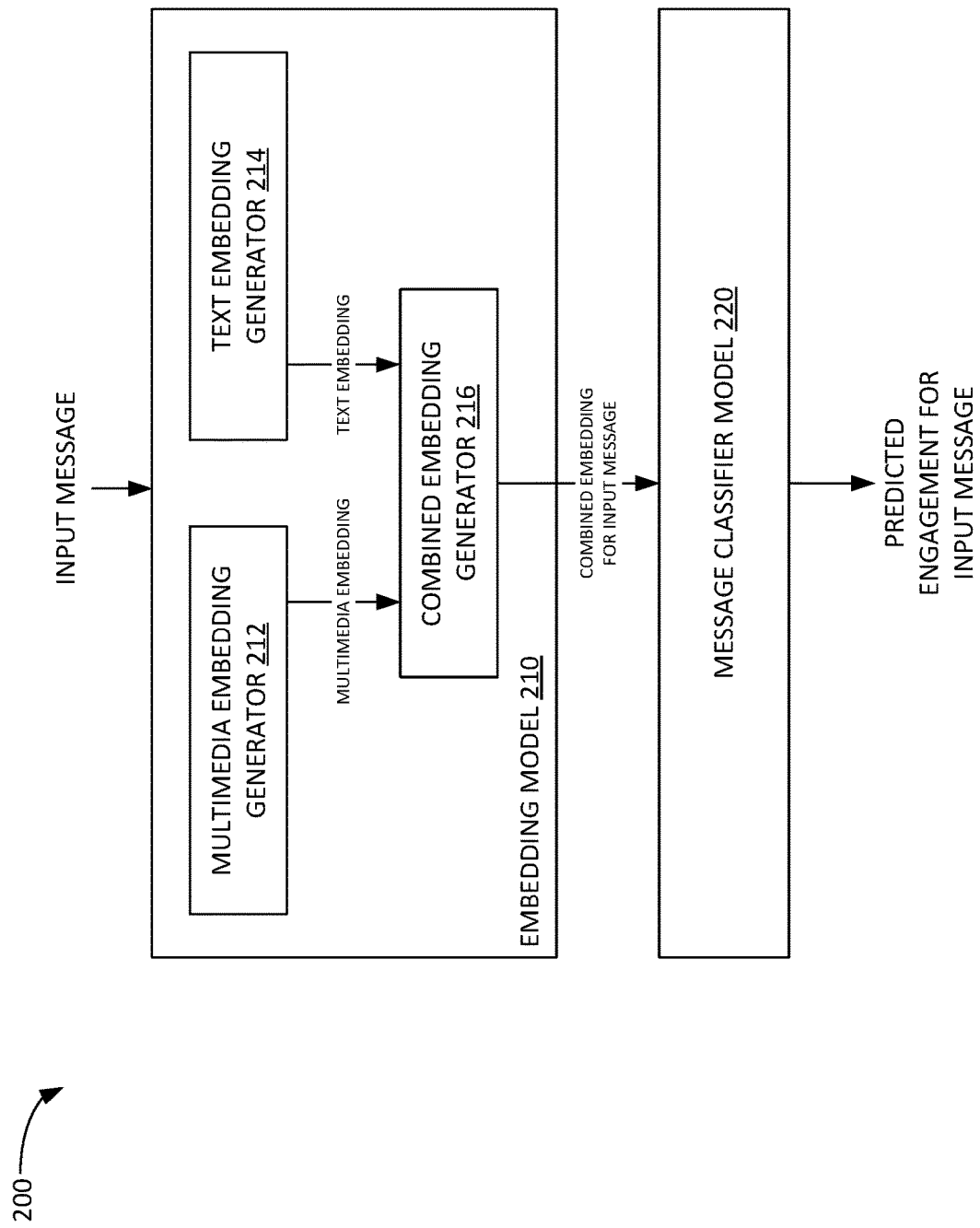
FIG. 2 illustrates an example of a machine learning model pipeline for predicting effectiveness of a mixed-modality message, according to embodiments of the present disclosure.

Example Machine Learning Model for Predicting
Effectiveness of Mixed-Modality Messages FIG. 2 illustrates an example of a machine learning model pipeline 200 for predicting effectiveness of a mixed-modality message, according to embodiments of the present disclosure.

As illustrated, pipeline 200 includes an embedding model 210 (which may correspond to the first machine learning model discussed above with respect to FIG. 1) and a message classifier model 220 (which may correspond to the second machine learning model discussed above with respect to FIG. 1). To predict the effectiveness of a mixed-modality message (e.g., in terms of a predicted level of engagement, as illustrated in FIG. 2, a binary classification, or the like), an input message provided to pipeline 200 may be input into embedding model 210 for processing into an embedding representation of the input message. The input message may be, for example, a mixed-modality message including content in a multimedia modality (e.g., audio/visual data) and content in a text modality. The different modalities of content included in the input message may be input into respective embedding generators in order to generate modality-specific embeddings for the different types of content included in the mixed-modality message. For example, as illustrated, the input message may be split into multimedia content processed by multimedia embedding generator 212 and text content processed by text embedding generator 214. Multimedia embedding generator 212 may generate a multimedia embedding representing the mapping of the multimedia content included in a mixed-modality message into a latent space (or embedding space); meanwhile, text embedding generator 214 may generate a text embedding representing the mapping of the text content included in the mixed-modality message into a (different) latent space. While FIG. 2 illustrates modality-specific embedding generators for multimedia content and for textual content, it should be recognized by one of skill in the art that embedding model 210 may include any number of embedding representation generators for use in generating embedding representations of various types of data that may be included in an input message for which an effectiveness prediction is to be made. For example, multimedia embedding generator 212 may be separated, in some aspects, into an embedding generator for visual content (e.g., images, video data, etc.) and a separate embedding generator for sound content. In some aspects, other modalities, such as sensor data modalities, may have dedicated embedding generators included in embedding model 210.

Combined embedding generator 216 combines the modality-specific embeddings into a combined embedding representing the input message. Various techniques may be used to combine the modality-specific embeddings into the combined embedding representing the input message. In one example, the combined embedding may be generated by concatenating the different modality-specific embedding representations into a single embedding representation (e.g., treating each of the modality-specific embedding representations as a string which can be combined with other strings in order to generate a longer string). In another example, the combined embedding may be generated based on mathematical operations applied to the different modality-specific embeddings. For example, the combined embedding may be generated based on a sum of modality-specific embeddings, a difference between modality-specific embeddings, or the like.

After combined embedding generator 216 generates a combined embedding representation for the input message, the combined embedding representation may be provided as input to message classifier model 220 for further analysis. As discussed, message classifier model 220 can use the input combined embedding in order to make a decision of whether to allow the message to be transmitted (e.g., via message placement service 122 illustrated in FIG. 1) or to block transmission of the message. In some aspects, message classifier model 220 may be a binary classifier model configured to output a prediction of whether the input message is effective or ineffective. In another aspect, message classifier model 220 may be a predictive model that predicts a level of interaction (e.g., in terms of clicks in the generated messages, web page views, etc.) between the mixed-modality input message and parties who receive the mixed-modality message. The predicted effectiveness of the mixed-modality message may be output (e.g., to a message placement service, such as message placement service 122 illustrated in FIG. 1) for use in managing the transmission of mixed-modality message to specific recipients.

Figure 3:
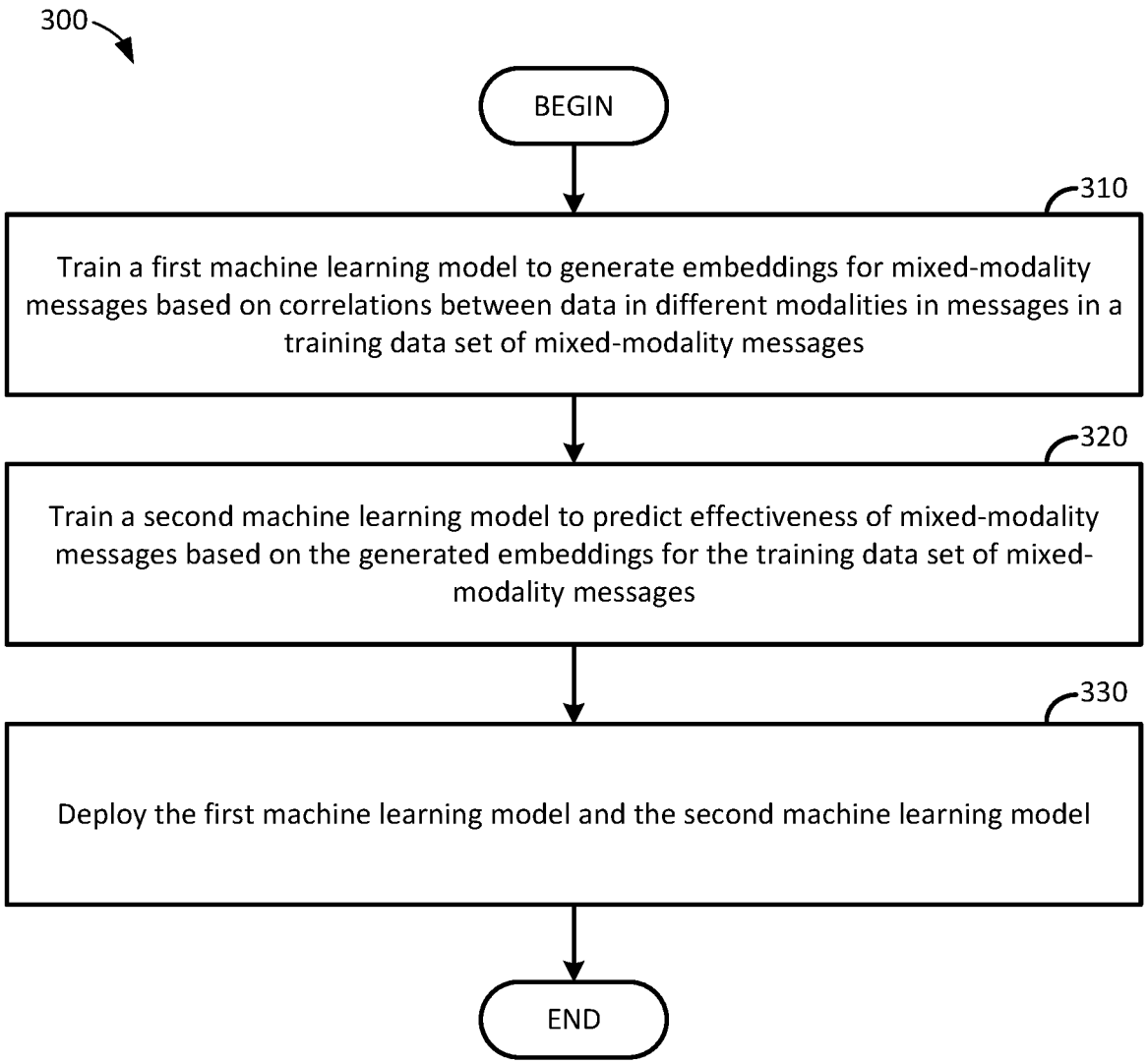
FIG. 3 illustrates example operations for training machine learning models to predict the effectiveness of mixed-modality messages, according to embodiments of the present disclosure.

Example Methods for Managing Transmission of Mixed-Modality Messages Using Machine Learning Models FIG. 3 illustrates example operations 300 that may be performed to train machine learning models to predict the effectiveness of mixed-modality messages, according to aspects of the present disclosure. Operations 300 may be performed by any computing device which can train one or more machine learning models, such as model training system 110 illustrated in FIG. 1.

As illustrated, operations 300 begin at block 310, with training a first machine learning model to generate embeddings for mixed-modality messages based on correlations between data in different modalities in messages in a training data set of mixed-modality messages.

In some aspects, the first machine learning model may be a contrastive estimation model. The contrastive estimation model may be trained to generate embedding representations of data in different modalities based on an association between data in a first modality and data in a second modality in a mixed-modality message. For example, as discussed above, the first machine learning model may be a contrastive language-image pretraining (CLIP) model trained to generate embedding representations of a mixed-modality message based on the semantic meaning of the content in the text modality and the content in the image modality in a mixed-modality message including textual content and image content.

At block 320, operations 300 proceed with training a second machine learning model to predict effectiveness of mixed-modality messages based on the generated embeddings for the training data set of mixed-modality messages.

In some aspects, the second machine learning model may be a model trained using supervised learning techniques. The embedding representations of the messages in the training data set of mixed-modality messages may be mapped to one or more effectiveness metrics for the messages in the training data set of mixed-modality messages. For example, the embedding representations (which may be generated by the first machine learning model) may be mapped to information such as a click-through rate associated with a message, a rate at which recipients of a message perform a desired action, or the like.

In some aspects, the second machine learning model may be a gradient boosting decision tree.

At block 330, operations 300 proceed with deploying the first machine learning model and the second machine learning model.

In some aspects, operations 300 further include generating the training data set of mixed-modality messages. The training data set of mixed-modality messages may be generated based on a first set of historical mixed-modality messages associated with users having message effectiveness metrics below a first threshold value and a second set of historical mixed-modality messages associated with users having message effectiveness metrics above a second threshold value. The first set of historical mixed-modality messages may correspond to historical messages that were ineffective messages, while the second set of historical mixed-modality messages may correspond to historical messages that were effective messages. In some aspects, the effectiveness metrics associated with the messages in the training data set may be a binary metric, with messages in the first set having effectiveness scores of 0 (corresponding to a classification as an ineffective message) and messages in the second set having effectiveness scores of 1 (corresponding to a classification as an effective message).

Figure 4:
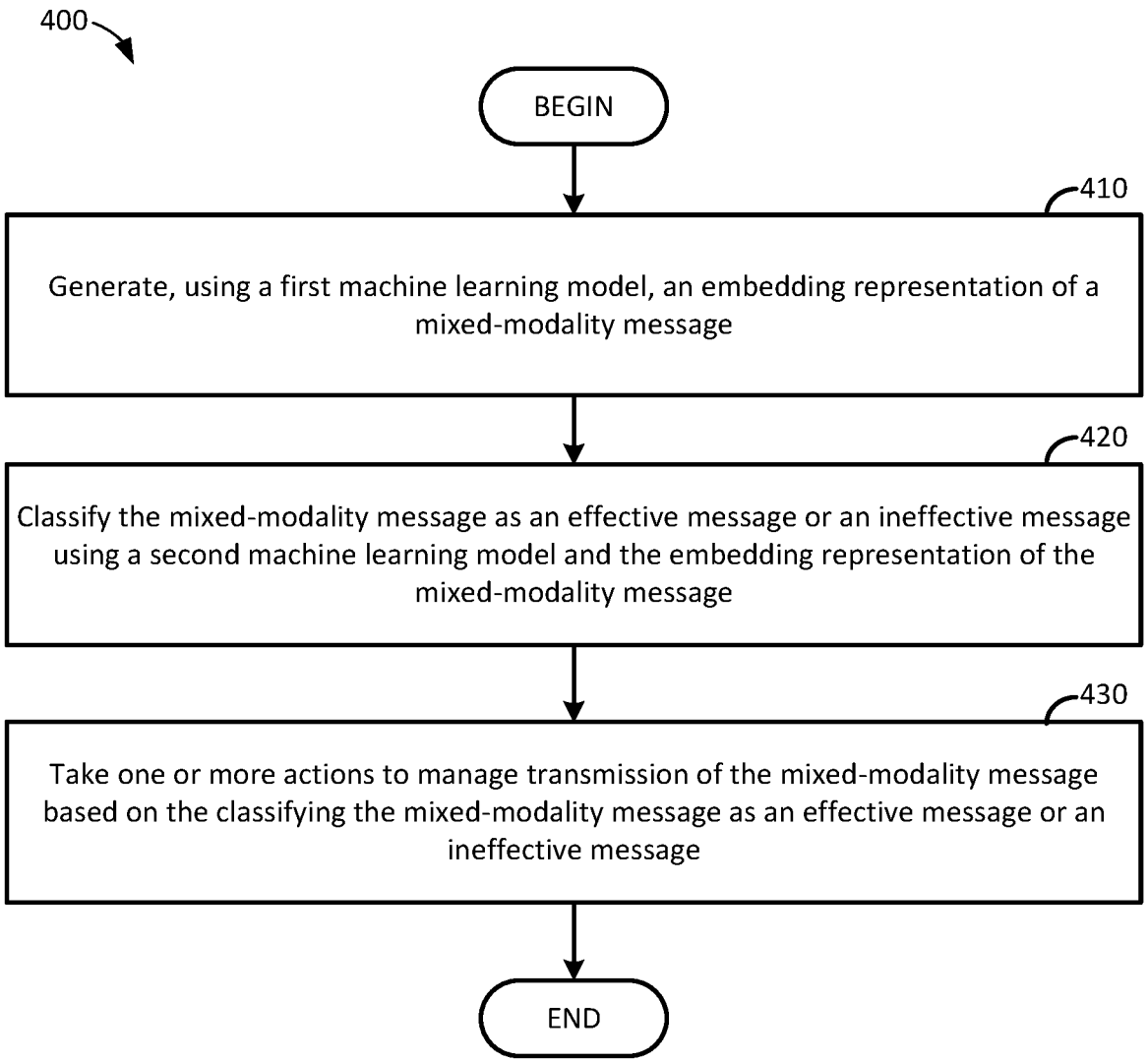
FIG. 4 illustrates example operations for managing the transmission of mixed-modality messages based on effectiveness of mixed-modality messages predicted by machine learning models, according to embodiments of the present disclosure.

FIG. 4 illustrates example operations 400 that may be performed for managing the transmission of mixed-modality messages based on effectiveness of mixed-modality messages predicted by machine learning models, according to embodiments of the present disclosure. Operations 400 may be performed, for example, by a computing device which can be used to manage the transmission of mixed-modality messages to a defined set of recipients, such as server 120 illustrated in FIG. 1.

As illustrated, operations 400 begin at block 410, with generating, using a first machine learning model, an embedding representation of a mixed-modality message.

In some aspects, generating the embedding representation of the mixed-modality message includes generating a first embedding representation of data in a first modality in the mixed-modality message. A second embedding representation may be generated for data in a second modality in the mixed-modality message. The first embedding representation and the second embedding representation may be combined into the embedding representation of the mixed-modality message. For example, the first embedding representation and the second embedding representation may be concatenated, mathematically combined (e.g., based on an addition operation, subtraction operation, multiplication operation, etc.), or otherwise combined into an embedding representation that takes into account the embeddings for the data in different modalities in the mixed-modality message.

In some aspects, the first machine learning model may be a contrastive estimation model. The contrastive estimation model may be trained to generate embedding representations of data in different modalities based on an association between data in a first modality and data in a second modality in a mixed-modality message. For example, as discussed above, the first machine learning model may be a contrastive language-image pretraining (CLIP) model trained to generate embedding representations of a mixed-modality message based on the semantic meaning of the content in the text modality and the content in the image modality in a mixed-modality message including textual content and image content.

At block 420, operations 400 proceed with classifying the mixed-modality message as an effective message or an ineffective message using a second machine learning model and the embedding representation of the mixed-modality message.

In some aspects, the second machine learning model may be a model trained using supervised learning techniques. The embedding representations of the messages in the training data set of mixed-modality messages may be mapped to one or more effectiveness metrics for the messages in the training data set of mixed-modality messages. For example, the embedding representations (which may be generated by the first machine learning model) may be mapped to information such as a click-through rate associated with a message, a rate at which recipients of a message perform a desired action, or the like.

In some aspects, the second machine learning model may be a gradient boosting decision tree.

At block 430, operations 400 proceed with taking one or more actions to manage transmission of the mixed-modality message based on the classifying the mixed-modality message as an effective message or an ineffective message.

In some aspects, the one or more actions may include blocking transmission of the mixed-modality message to a defined set of recipients when the mixed-modality message is classified as an ineffective message.

In some aspects, the one or more actions may include indicating, to a user associated with the mixed-modality message, that a mismatch exists between data of a first modality in the mixed-modality message and data of a second modality in the mixed-modality message. Such a mismatch may occur when a message is classified as an ineffective message, as an ineffective message may generally exhibit weak or no correlation between data in different modalities (e.g., text that has a significantly different semantic meaning than the associated image content included in the message).

In some aspects, the mixed-modality message comprises a first portion having content in a multimedia modality and a second portion having content in a text modality.

Figure 5:
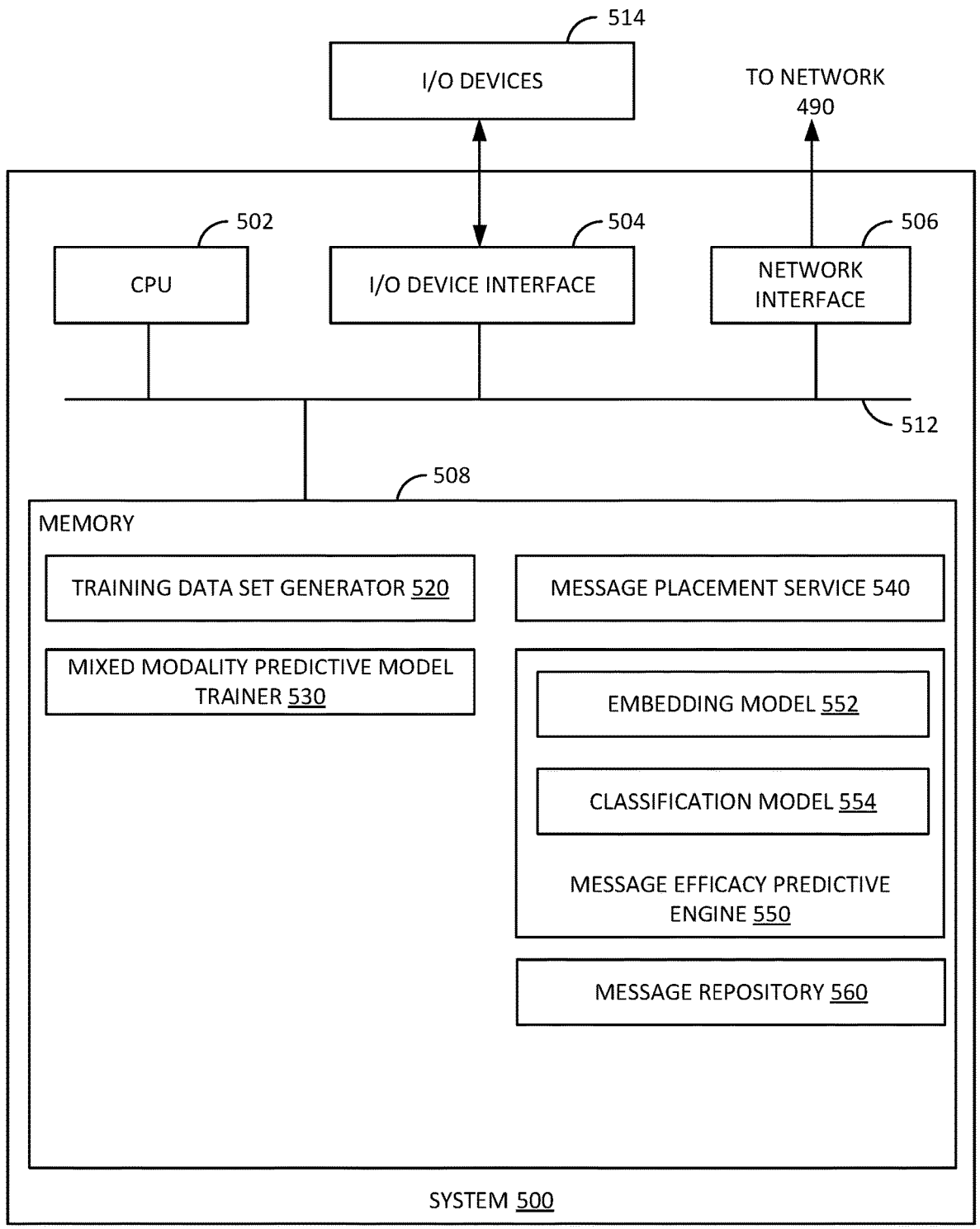
FIG. 5 illustrates an example system on which embodiments of the present disclosure can be performed.

Example System Managing Transmission of Mixed-Modality Messages Using Machine Learning Models FIG. 5 illustrates an example system 500 in which predictive risk models are trained and used to place targeted messages in communications generated by a software application for users of the software application. System 500 may correspond to one or both of model training system 110 and server 120 illustrated in FIG. 1. In some aspects, system 500 may perform the methods as described with respect to FIGS. 3 and 4.

As shown, system 500 includes a central processing unit (CPU) 502, one or more I/O device interfaces 504 that may allow for the connection of various I/O devices 514 (e.g., keyboards, displays, mouse devices, pen input, etc.) to the system 500, network interface 506 through which system 500 is connected to network 490 (which may be a local network, an intranet, the internet, or any other group of computing devices communicatively connected to each other), a memory 508, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508.

CPU 502 is included to be representative of a single CPU, multiple CPUs, a single CPU having multiple processing cores, and the like.

Memory 508 is representative of a volatile memory, such as a random access memory, or a nonvolatile memory, such as nonvolatile random access memory, phase change random access memory, or the like. As shown, memory 508 includes a training data set generator 520, mixed modality predictive model trainer 530, message placement service 540, message efficacy predictive engine 550, and message repository 560.

Training data set generator 520 generally corresponds to training data set generator 112 illustrated in FIG. 1. Generally, training data set generator 520 uses information about historical mixed-modality messages and the effectiveness metrics associated with these historical mixed-modality messages (e.g., stored in message repository 560, which may correspond to message data repository 130 illustrated in FIG. 1) to generate one or more training data sets which can be used by mixed modality predictive model trainer to train the models deployed to message efficacy predictive model engine 550. The training data sets may include training data sets for different types of users of message placement service 540 (e.g., based on an assumption that effective messages may differ for different types of users). Generally, the training data sets may be generated by selecting, for a specific type of user, a set of highly effective messages and a set of highly ineffective messages for inclusion. Highly effective messages may correspond to messages having effectiveness metrics above a first threshold level, and highly ineffective messages may correspond to messages having effectiveness metrics below a second threshold level.

Mixed modality predictive model trainer 530 generally corresponds to mixed modality predictive model trainer 114 illustrated in FIG. 1. Generally, mixed modality predictive model trainer 530 uses the training data sets generated by training data set generator 520 to train one or more machine learning models which can be used to predict the effectiveness of a mixed-modality message based on correlations between data in different modalities in the message. The one or more machine learning models may include an embedding model 552, which may be trained to generate an embedding representation of a mixed-modality message based on embedding representations of data in each modality of data included in a mixed-modality message, and a classification model 454 trained to classify a mixed-modality message as an effective message or an ineffective message based on an embedding generated by embedding model 552.

Message placement service 540 generally corresponds to message placement service 122 illustrated in FIG. 1. Generally, message placement service 540 receives requests from users of the message placement service 540 to transmit a mixed-modality message to a defined set of recipients. Message placement service 540 generally provides the input mixed-modality message to message efficacy predictive engine 550 and receives at least a prediction of whether the message will be an effective message or an ineffective message. Message placement service 540 may allow transmission of a mixed-modality message predicted to be an effective message to the defined set of recipients and may block, or at least delay, the transmission of a mixed-modality message predicted to be an ineffective message.

Message efficacy predictive engine 550 generally uses the machine learning models trained by mixed modality predictive model trainer 530 to predict the effectiveness of a mixed-modality message. The predicted effectiveness of a mixed-modality message may be, for example, a binary classification that classifies a message as either effective or ineffective, a predicted level of engagement, or other effectiveness metrics that can indicate how likely it is that recipients will interact with a mixed-modality message or otherwise perform a desired action in response to receiving the mixed-modality message. As illustrated, message efficacy predictive engine includes an embedding model 552 and a classification model 554. The embedding model 552 generally generates a combined embedding of a mixed-modality message based on modality-specific embeddings for different modalities of data included in the mixed-modality message. Meanwhile, the classification model 554 generally uses the combined embedding of the mixed-modality message generated by the embedding model 552 to predict the effectiveness of the mixed-modality message.

Note that FIG. 5 is just one example of a system, and other systems including fewer, additional, or alternative components are possible consistent with this disclosure.

EXAMPLE CLAUSES

Implementation examples are described in the following numbered clauses:

Clause 1: A method, comprising: generating, using a first machine learning model, an embedding representation of a mixed-modality message; classifying the mixed-modality message as an effective message or an ineffective message using a second machine learning model and the embedding representation of the mixed-modality message; and taking one or more actions to manage transmission of the mixed-modality message based on the classifying the mixed-modality message as an effective message or an ineffective message.

Clause 2: The method of Clause 1, wherein generating the embedding representation of the mixed-modality message comprises: generating a first embedding representation of data in a first modality in the mixed-modality message; generating a second embedding representation of data in a second modality in the mixed-modality message; and concatenating the first embedding representation and the second embedding representation.

Clause 3: The method of Clauses 1 or 2, wherein the first machine learning model comprises a contrastive estimation model trained to generate embedding representations of data in different modalities based on an association between data in a first modality and data in a second modality in the mixed-modality message.

Clause 4: The method of any of Clauses 1 through 3, wherein the second machine learning model comprises a model trained based on a data set of embedding representations of historical mixed-modality messages mapped to one or more effectiveness metrics for the historical mixed-modality messages.

Clause 5: The method of Clause 4, wherein the second machine learning model comprises a gradient boosting decision tree.

Clause 6: The method of any of Clauses 1 through 5, wherein the one or more actions comprises blocking transmission of the mixed-modality message when the mixed-modality message is classified as an ineffective message.

Clause 7: The method of any of Clauses 1 through 6, wherein the one or more actions comprises indicating, to a user associated with the mixed-modality message, that a mismatch exists between data of a first modality in the mixed-modality message and data of a second modality in the mixed-modality message.

Clause 8: The method of any of Clauses 1 through 7, wherein the mixed-modality message comprises a first portion having content in a multimedia modality and a second portion having content in a text modality.

Clause 9: A method, comprising: training a first machine learning model to generate embeddings for mixed-modality messages based on correlations between data in different modalities in messages in a training data set of mixed-modality messages; training a second machine learning model to predict effectiveness of mixed-modality messages based on the generated embeddings for the training data set of mixed-modality messages; and deploying the first machine learning model and the second machine learning model.

Clause 10: The method of Clause 9, wherein the first machine learning model comprises a contrastive estimation model trained to generate embedding representations of data in different modalities based on an association between data in a first modality and data in a second modality in a mixed-modality message.

Clause 11: The method of Clauses 9 or 10, wherein the second machine learning model comprises a model trained based on embedding representations of the messages in the training data set of mixed-modality messages mapped to one or more effectiveness metrics for the messages in the training data set of mixed-modality messages.

Clause 12: The method of Clause 11, wherein the second machine learning model comprises a gradient boosting decision tree.

Clause 13: The method of any of Clauses 9 through 12, further comprising generating the training data set of mixed-modality messages based on a first set of historical mixed-modality messages associated with users having message effectiveness metrics below a first threshold value and a second set of historical mixed-modality messages associated with users having message effectiveness metrics above a second threshold value.

Clause 14: A system, comprising: a memory having executable instructions stored thereon; and a processor configured to execute the executable instructions to perform the methods of any one of Clauses 1 through 13.

Clause 15: A system, comprising: means for performing the methods of any one of Clauses 1 through 13.

Clause 16: A computer-readable medium having instructions stored thereon which, when executed by a processor, performs the methods of any one of Clauses 1 through 13.

ADDITIONAL CONSIDERATIONS

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   generating, by one or more processors of a computing system, using a first machine learning model, an embedding representation of a mixed-modality message;
   classifying, by the one or more processors, the mixed-modality message as an effective message or an ineffective message using a second machine learning model and the embedding representation of the mixed-modality message; and
   taking, by the one or more processors, one or more actions to manage transmission of the mixed-modality message based on the classifying the mixed-modality message as an effective message or an ineffective message.

2. The method of claim 1, wherein generating the embedding representation of the mixed-modality message comprises:
   generating, by the one or more processors, a first embedding representation of data in a first modality in the mixed-modality message;
   generating, by the one or more processors, a second embedding representation of data in a second modality in the mixed-modality message; and
   concatenating, by the one or more processors, the first embedding representation and the second embedding representation.

3. The method of claim 1, wherein the first machine learning model comprises a contrastive estimation model trained to generate embedding representations of data in different modalities based on an association between data in a first modality and data in a second modality in the mixed-modality message.

4. The method of claim 1, wherein the second machine learning model comprises a model trained based on a data set of embedding representations of historical mixed-modality messages mapped to one or more effectiveness metrics for the historical mixed-modality messages.

5. The method of claim 4, wherein the second machine learning model comprises a gradient boosting decision tree.

6. The method of claim 1, wherein the one or more actions comprises blocking transmission of the mixed-modality message when the mixed-modality message is classified as an ineffective message.

7. The method of claim 1, wherein the one or more actions comprises indicating, to a user associated with the mixed-modality message, that a mismatch exists between data of a first modality in the mixed-modality message and data of a second modality in the mixed-modality message.

8. The method of claim 1, wherein the mixed-modality message comprises a first portion having content in a multimedia modality and a second portion having content in a text modality.

9. The method of claim 1, wherein the classification of the mixed-modality message as an effective message or an ineffective message is based on a prediction regarding a level of user interaction with the message.

10. The method of claim 1, wherein the classification of the mixed-modality message as an effective message or an ineffective message is based on a level of correlation between different modalities of the message.

11. A method, comprising:
    training, by one or more processors of a computing system, a first machine learning model to generate embeddings for mixed-modality messages based on correlations between data in different modalities in messages in a training data set of mixed-modality messages;

training, by the one or more processors, a second machine learning model to predict effectiveness of mixed-modality messages based on the generated embeddings for the training data set of mixed-modality messages; and deploying, by the one or more processors, the first machine learning model and the second machine learning model.

12. The method of claim 11, wherein the first machine learning model comprises a contrastive estimation model trained to generate embedding representations of data in different modalities based on an association between data in a first modality and data in a second modality in a mixed-modality message.

13. The method of claim 11, wherein the second machine learning model comprises a model trained based on embedding representations of the messages in the training data set of mixed-modality messages mapped to one or more effectiveness metrics for the messages in the training data set of mixed-modality messages.

14. The method of claim 13, wherein the second machine learning model comprises a gradient boosting decision tree.

15. The method of claim 11, further comprising generating the training data set of mixed-modality messages based on a first set of historical mixed-modality messages associated with users having message effectiveness metrics below a first threshold value and a second set of historical mixed-modality messages associated with users having message effectiveness metrics above a second threshold value.

16. A system, comprising:
a memory having executable instructions stored thereon; and
one or more processors configured to execute the executable instructions in order to cause the system to:
generate, using a first machine learning model, an embedding representation of a mixed-modality message;
classify the mixed-modality message as an effective message or an ineffective message using a second machine learning model and the embedding representation of the mixed-modality message; and
take one or more actions to manage transmission of the mixed-modality message based on the classifying the mixed-modality message as an effective message or an ineffective message.

17. The system of claim 16, wherein in order to generate the embedding representation of the mixed-modality message, the processor is configured to cause the system to:
generate a first embedding representation of data in a first modality in the mixed-modality message;
generate a second embedding representation of data in a second modality in the mixed-modality message; and
concatenate the first embedding representation and the second embedding representation.

18. The system of claim 16, wherein the first machine learning model comprises a contrastive estimation model trained to generate embedding representations of data in different modalities based on an association between data in a first modality and data in a second modality in the mixed-modality message.

19. The system of claim 16, wherein the second machine learning model comprises a model trained based on a data set of embedding representations of historical mixed-modality messages mapped to one or more effectiveness metrics for the historical mixed-modality messages.

20. The system of claim 16, wherein the one or more actions comprises blocking transmission of the mixed-modality message when the mixed-modality message is classified as an ineffective message.

21. The system of claim 16, wherein the one or more actions comprises indicating, to a user associated with the mixed-modality message, that a mismatch exists between data of a first modality in the mixed-modality message and data of a second modality in the mixed-modality message.

22. The system of claim 16, wherein the mixed-modality message comprises a first portion having content in a multimedia modality and a second portion having content in a text modality.

* * * * *